(12) United States Patent
Barker et al.

(10) Patent No.: US 7,818,298 B2
(45) Date of Patent: Oct. 19, 2010

(54) SYSTEM AND METHOD FOR TRACKING DOCUMENTS IN AN ON-DEMAND SERVICE

(75) Inventors: Timothy J. Barker, San Francisco, CA (US); Ryan Lissack, San Francisco, CA (US); Daniel L. Pletter, Oakland, CA (US)

(73) Assignee: Salesforce.com, Inc., San Francisco, CA (US)

( * ) Notice: Subject to any disclaimer, the term of this patent is extended or adjusted under 35 U.S.C. 154(b) by 320 days.

(21) Appl. No.: 11/879,535

(22) Filed: Jul. 17, 2007

(65) Prior Publication Data

US 2009/0024673 A1 Jan. 22, 2009

Related U.S. Application Data

(63) Continuation-in-part of application No. 11/825,393, filed on Jul. 6, 2007, now abandoned.

(51) Int. Cl.
*G06F 17/30* (2006.01)
(52) U.S. Cl. .................. 707/638; 707/695; 707/999.203
(58) Field of Classification Search ...................... 707/8, 707/638, 695, 697, 999.203
See application file for complete search history.

(56) References Cited

U.S. PATENT DOCUMENTS

2003/0154387 A1* 8/2003 Evans et al. ................. 713/193

OTHER PUBLICATIONS

Title: "NextPage", Date: Jul. 6, 2006 URL: http://web.archive.org/web/20060706184011/http://nextpage.com/, Company Address: NextPage Global Headquarters, 13997 South Minuteman Drive, Draper, UT 84020 (No. of Pages 6).

* cited by examiner

*Primary Examiner*—Cheryl Lewis
(74) *Attorney, Agent, or Firm*—David Lewis; Jennifer A. Haynes

(57) ABSTRACT

In accordance with embodiments, there are provided mechanisms and methods for tracking documents in an on-demand service. These mechanisms and methods for tracking documents in an on-demand service can enable embodiments to provide the sharing of documents and the tracking of whether one of the shared documents was changed. The ability of embodiments to provide the sharing of documents and the tracking can enable a safeguard that a user knows whether the document that they have in their possession is the most recent version.

In an embodiment, the shared documents are stored in a document management storage. In an embodiment, each file has an ID that includes version information for checking whether the document is the most recent version. In an embodiment, an application is downloaded onto the user system that automatically upon opening a document checks whether a document is the most recent version.

40 Claims, 12 Drawing Sheets

SYSTEM AND METHOD FOR TRACKING DOCUMENTS IN AN ON-DEMAND SERVICE

CROSS REFERENCE TO RELATED APPLICATIONS

This is a continuation-in-part of U.S. patent application Ser. No. 11/825,393 entitled SYSTEM AND METHOD FOR TRACKING DOCUMENTS IN AN ON-DEMAND SERVICE, by Timothy Barker et al., filed Jul. 6, 2007 now abandoned, which is incorporated herein by reference in its entirety.

The following commonly owned, co-pending United States Patents and Patent Applications, including the present application and the above-referenced parent application, are related to each other. Each of the other patents/applications are incorporated by reference herein in its entirety:

U.S. patent application Ser. No. 11/825,393 entitled SYSTEM AND METHOD FOR TRACKING DOCUMENTS IN AN ON-DEMAND SERVICE, by Timothy Barker et al., filed Jul. 6, 2007;

U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007; and U.S. patent application Ser. No. 11/893,617 entitled METHOD AND SYSTEM FOR PUSHING DATA TO SUBSCRIBERS IN AN ON-DEMAND SERVICE, by Timothy Barker et al., filed Aug. 15, 2007.

U.S. patent application Ser. No. 11/879,535 entitled SYSTEM AND METHOD FOR TRACKING DOCUMENTS IN AN ON-DEMAND SERVICE, by Timothy Barker et al., filed Jul. 17, 2007;

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to tracking documents in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional document management systems, users access their documents stored in one logical storage space. A user of such a conventional system typically retrieves documents from and stores documents on the system using the user's own systems. A user system might remotely access one of a plurality of server systems that might in turn access the document management system. Document retrieval from the system might include the issuance of a query from the user system to the document management system. The document management system might process such a request received in the form of a query and send to the user system information about documents stored in the document management system that are relevant to the request. The ability to share documents among multiple individuals, the ability to provide the retrieval of accurate information relating the shared documents and the ability to deliver this information to the user system are desirable characteristics of document management systems in general.

Unfortunately, with conventional database approaches, while sharing files, after a first user downloads a file to the user system, the file may be subsequently edited by another user. This second user may update the document storage management systems with their edited version of the document. The first user may unknowingly open the document they downloaded to their user system and rely on its contents even though the contents may now be out of date. Conventional approaches frequently try to address this issue by allowing users to send emails or other messages to users when they update a file in the document storage management system.

Unfortunately, such conventional approaches suffer from the flaw that, when updating files in the document storage management system, users must select to send messages to a potentially large number of other users, many of whom will have no immediate interest in knowing that the file has been updated. Thus, these conventional approaches become cumbersome as the number of documents and users grow in the system.

Accordingly, it is desirable to provide improved techniques enabling the tracking of changes in a document that is being shared by multiple users of the document management system.

BRIEF SUMMARY

In accordance with embodiments, there are provided mechanisms and methods for tracking documents in an on-demand service. These mechanisms and methods for tracking documents in an on-demand service can enable embodiments to provide the capability to share documents and to track whether a shared documents has changed. The ability of embodiments to provide the capability to share documents and to track whether a shared document has changed can be a safeguard that allows a user to know, whether the document that they have in their possession is the most recent version.

In an embodiment and by way of example, a method for tracking documents stored on behalf of a plurality of organizations is provided. One method embodiment includes receiving an original document to store on behalf of a first organization. A copy of the original document may be stored to document management storage. The original document and the copy of the original document in the document management storage may be tracked by a unique identifier assigned to the original document and a corresponding unique identifier assigned to the copy of the original document stored in the document management storage. The unique identifier assigned to the copy of the original document stored in the document management storage may be tracked using a portion of a database limited to information of the first organization. Coupling with an on-demand database service enables, one embodiment to provide automatically limiting access to the document management storage to the first organization. Documents stored on behalf of other organizations may likewise be tracked by the same on-demand database service.

In an embodiment, after the user joins the group, documents may be downloaded from the document management storage into the user's system (e.g., into the user's desktop). In an embodiment, when a user opens one of the documents that was downloaded from the document management storage, a check is performed to determine whether the document opened is the most recent version. This check may be performed in an embodiment by comparing unique identifiers of the two copies of the document (e.g., the copy residing on the user's desktop and the copy stored by the document management system). In an embodiment, if the user's copy of the document is not the most recent version, a message may be sent to the user asking if the user wants to have the user's copy updated. In this specification, the terms "up-to-date," "current," and "most recent version" may be used interchangeably to describe various example embodiments and not as limitations.

In an embodiment, an identifier includes an identification portion, and also includes a hashed version of content of the document with which the identifier is associated. The identification portion may be used to identify that two documents at least originated from the same document, but possibly are different versions of the same document. The hashed content may be used to check whether there has been a change in content.

In an embodiment, initially a version number is checked. As a more thorough check, a hash value, such as a checksum, is checked to see if the two document contents are the same. An embodiment automatically checks version numbers to see if the user has the most recent document (as long as the user has network access or another connection to the server-side system for performing the check) without requiring the user consciously logging onto the site and without necessarily opening any browsers. In an embodiment, the identifier is the version number.

In an embodiment, initially a version number is checked. As a more thorough check, a hash value, such as a checksum, is checked to see if the two document contents are the same.

While the present invention is described with reference to an embodiment in which techniques for tracking documents in an on-demand service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
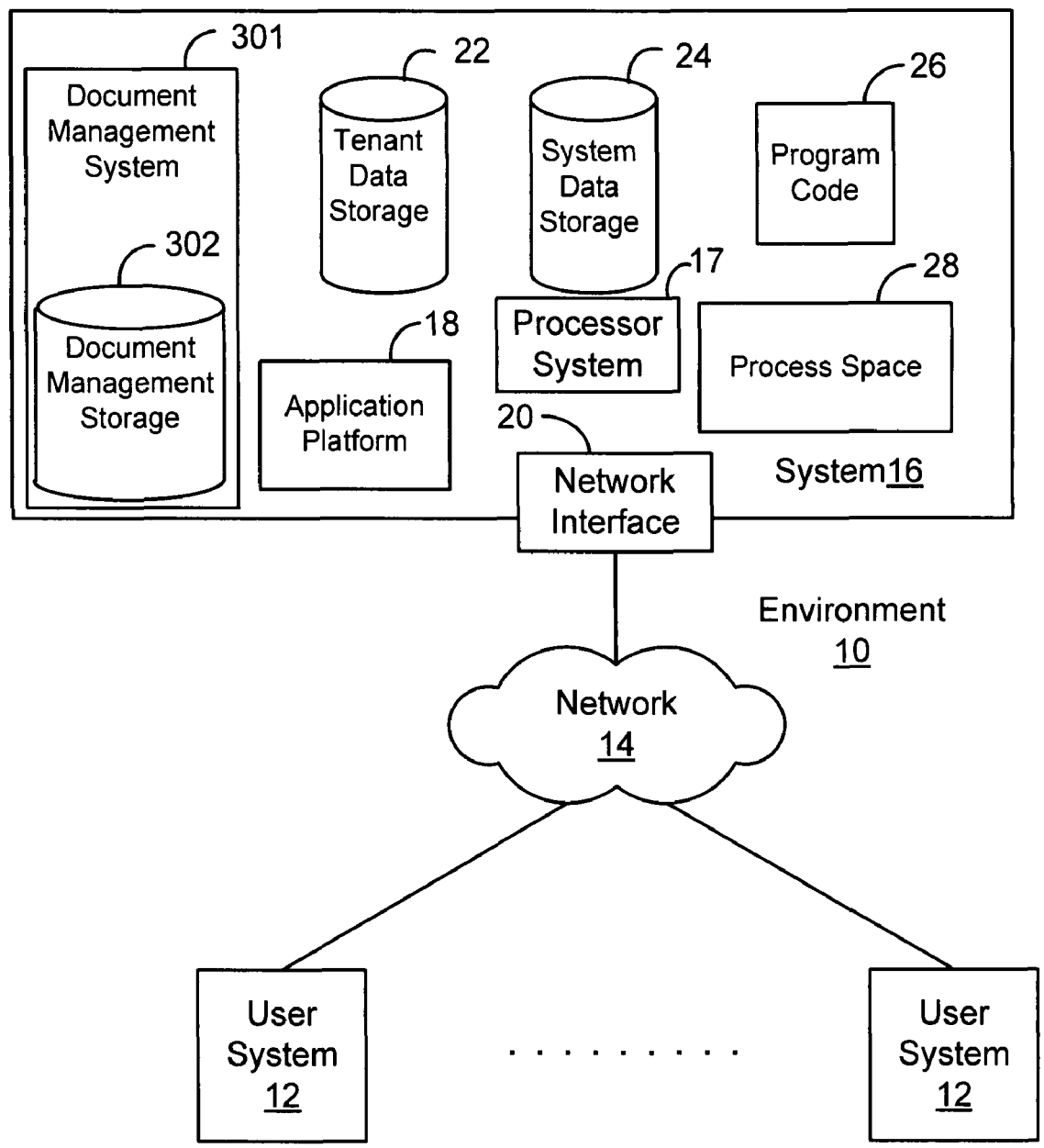
FIG. 1 illustrates a block diagram of an example of an environment wherein an on-demand document management system and database service might be used.

Systems and methods are provided for tracking documents in an on-demand service.

One method embodiment includes receiving an original document to store on behalf of a first organization. The document is stored in document management storage. This document management storage may be referred to as a "central depository" in some embodiments. In an embodiment, a single "master copy" of each document is stored in the document management storage. Enforcing such a "master copy" paradigm enables embodiments to ensure that document versioning is maintained across many different users accessing the document management storage service using any number of different computer's. An identifier (ID) is associated with the document when the document is uploaded to the document management storage. In an embodiment, the identifier is embedded into the document. Alternatively, the identifier may be associated with the name or the file identifier of a document using a look up table or other technique. Yet further, the identifier may be in-part determined from characteristics of the document, such as the name, date of creation, size or the like. In an embodiment, each ID is unique system wide and/or across all tenants. In an embodiment, the identifier may be updated each time the document is edited, so by comparing identifiers a determination may be made as to whether two copies of the same document have differences in their respective contents. In an embodiment, when a member (e.g., a user)

is added to a group that has access to the document management storage, an application is downloaded onto the user system for tracking documents downloaded from the document management storage and/or for updating documents downloaded to the user system. A tenant is an entity (a person, organization, group of people or other entity) that has an account on the multi-tenant system. The group is a group of people or other entities that have access to the document management storage. The members of a group may be a subset of the members of a tenant, may include multiple tenants, or may include multiple of subsets of different tenants. The documents that are managed by the tracker are stored in the document management storage.

In an embodiment, after a user joins a group, documents may be downloaded from the document management storage into the user's system (e.g., into the user's desktop). In an embodiment, each time the user opens one of the documents that was downloaded from the document management storage, the application checks whether the document opened is the most recent version. The application may perform the check by comparing the IDs of the two copies of the document. In an embodiment, if the user's copy of the document is not the most recent version, a message may be sent to the user asking if the user wants to have the user's copy updated. Conventional approaches frequently try to address the sharing of documents using a system of locks, so that when a first user obtains control of the document, all other users are blocked from accessing the document until the first user releases the document (and frees up the lock). Unfortunately, such conventional approaches suffer from the flaw that subsequent users cannot work on the document once the first user has obtained control of it. Thus, these conventional approaches cannot be made to scale to a large number of users that desire to access a document. In contrast, in an embodiment of the current system locks are not used.

In an embodiment, the ID includes an identification portion, and a hashed version of content of the document. The identification portion identifies that two documents at least originated from the same document, but possibly are different versions of the same original document. The hashed content may be used to check whether there has been a change in content. An application automatically checks the version numbers to see if the user has the most recent document (as long as the user has network access or another connection to the server-side system for performing the check) without requiring the user consciously logging onto the site and without necessarily opening any browsers.

In an embodiment, initially a version number is checked. In alternative embodiments, a hash value, such as a checksum, may be checked to see if the two document contents are the same.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing for tracking documents in an on-demand service will be described with reference to example embodiments.

System Overview

FIG. 1 illustrates a block diagram of an environment 10 wherein an on-demand document management system and database service might be used. Environment 10 may include user systems 12, network 14, system 16, processor system 17, application platform 18, network interface 20, tenant data storage 22, system data storage 24, program code 26, process space 28, document management system 301, and document management storage 302. In other embodiments, environment 10 may not have all of the components listed and/or may have other elements instead of, or in addition to, those listed above.

Environment 10 is an environment in which an on-demand database service coupled with a document management system exists. User system 12 may be any machine or system that is used by a user to access a database user system. For example, any of user systems 12 can be a handheld computing device, a mobile phone, a laptop computer, a workstation, and/or a network of computing devices. As illustrated in FIG. 1 (and in more detail in FIGS. 2 and 3) user systems 12 might interact via a network 14 with an on-demand database service, which is system 16, coupled with a document management system 301 and document management storage 302.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In an embodiment, a hierarchical role based model is not used. However, in systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes. System 16 may include document management system 301, which may include document management storage 302 supporting storage and retrieval of documents on behalf of tenants whose data is managed and housed by system 16.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
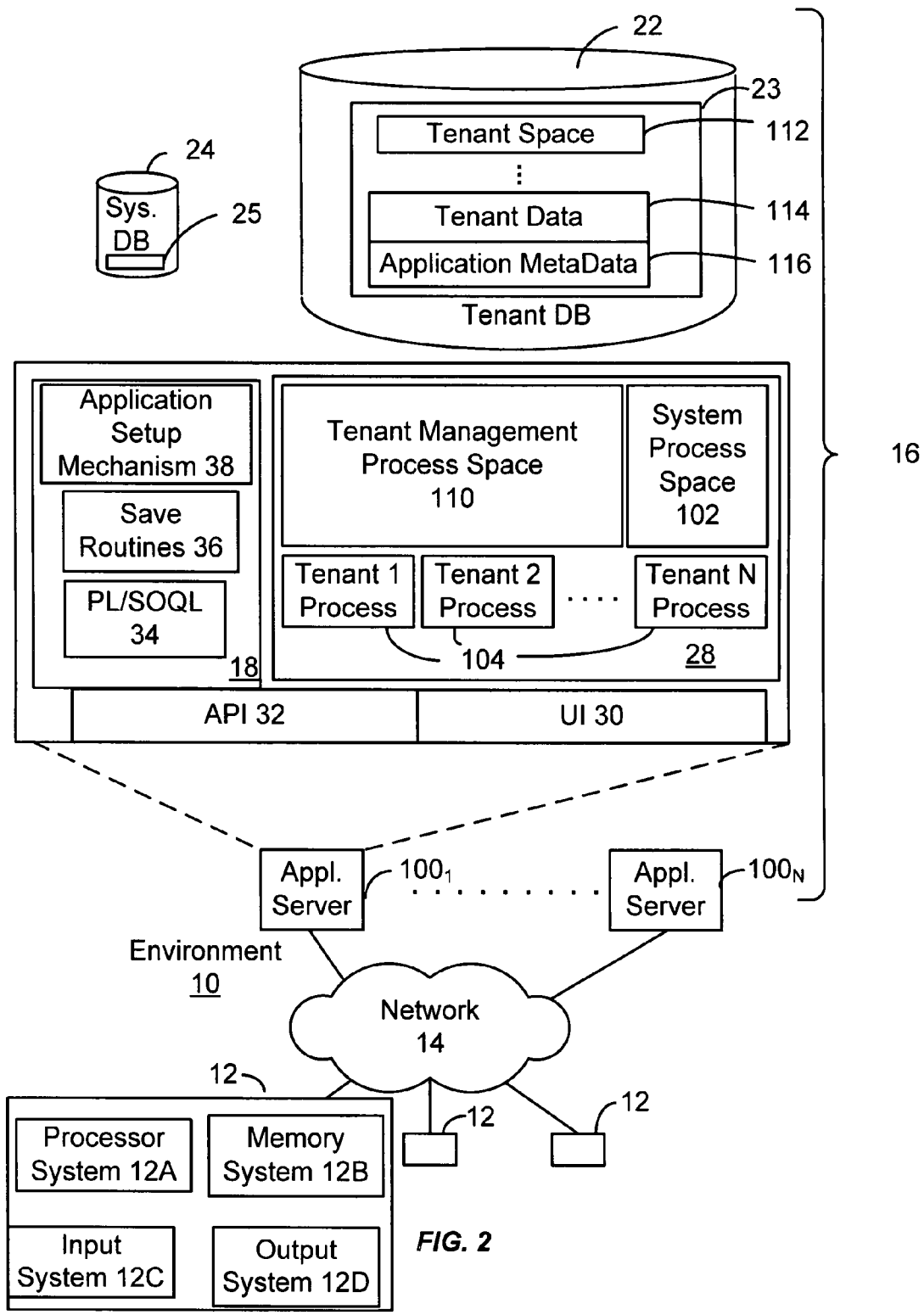
FIG. 2 illustrates a block diagram of an embodiment of elements of FIG. 1 and various possible interconnections between these elements.
Figure 3:
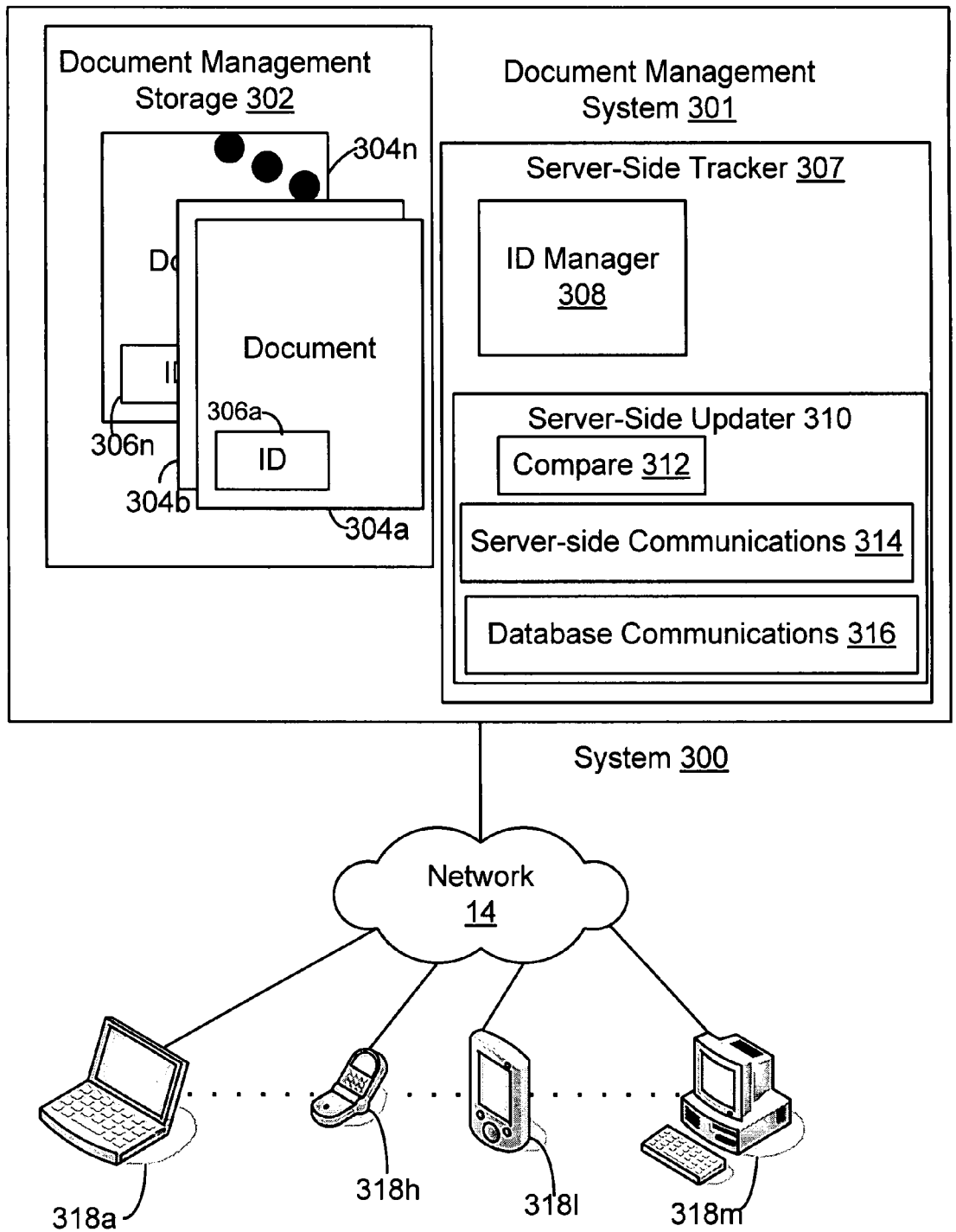
FIG. 3 illustrates a block diagram of an embodiment of system for tracking documents.

FIG. 2 and FIG. 3 also illustrate portions of environment 10. However, in FIGS. 2-3 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112 (which may also be referred to as "tenant storage space"), user storage 114 (which may also be referred to as "user data"), and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers of one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE SYSTEM AND METHOD FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe the server-side system for tracking documents. Then the client-side system for tracking documents is described. Next an ID associated with the documents will be described. Then a server-side method of tracking documents will be described. Afterwards a client side method of tracking documents will be described.

Server-Side Tracker

FIG. 3 shows a block diagram of an embodiment of system 300. System 300 may include document management system 301, which may include document management storage 302 having documents 304a-n with tags 305a-n and IDs 306a-n. Document management system 301 may also include server-side tracker 307, which in turn may include ID manager 308 and server-side updater 310. Server-side updater 310 may include compare 312, server-side communications 314, and database communications 316. System 300 may also include network 14 and network devices 318a-m. Documents 304a-n may also include or be associated with search fields 320a-n which may include authors 322a-n and categories 324a-n. In other embodiments, system 300 may not have all of the elements listed and/or may have other elements instead of or in addition to those listed.

Network 14 was discussed in conjunction with FIGS. 1 and 2. System 300 may be an embodiment of environment 10. Although in this specification, document management system 301 is described as performing various actions, it should be understood that this is a short hand for stating that the action associated with or performed by document management system 301 is performed via system 16. Document management system 301 may manage and track documents that are shared by a group of users. Document management storage 302 is a location for storing documents to which multiple people need access. Storing the documents in document management storage 302 may facilitate ensuring that there is only one master version of the latest, published version of a document and that multiple versions of the document with very different content are not created. Also, document management storage 302 may store historical versions of the document, so that the historical versions are available for access if needed. Additionally, storing the documents in document management storage 302 facilitates providing access to those that need access to the document. In an embodiment, document management storage 302 may be tenant data 114 or a location within tenant data 114.

Documents 304a-n are the documents stored in document management storage 302. Documents 304a-n may be user created documents, such as articles or sales materials.

Tags 305*a-n* are tags that are associated with or added to documents 304*a-n*, respectively. Tags 305*a-n* may be used for limiting the documents that need to be searched. Tags 305*a-n* may be keywords or phrases that one interested in finding documents 304*a-n* is likely to associate with documents 304*a-n*. Tags 305*a-n* tag documents 304*a-n*, respectively. Tags 305*a-n* are added by the user upon uploading and/or publishing documents 304*a-n*, respectively, and may be used as search parameters. The values of tags 305*a-n* may be used as values of keys in a database. Using tags 305*a-n* may reduce the number of documents that need to be searched, because only documents having the tag values of interest need to be searched.

IDs 306*a-n* may uniquely identify each of documents 304*a-n* and/or each version of each of documents 304*a-n*. Optionally, documents 304*a-n* may include multiple versions of one or more of documents 304*a-n* in addition to the most recent version of the documents. IDs 306*a-n* may include a hashed version of the documents 304*a-n*, which may be or may include a checksum of all of the contents of the documents 304*a-n*, respectively. Including a checksum of each document's contents in the document's ID allows a determination of whether the content of the document has changed. If the checksum of the ID has not changed, it is unlikely that the content of the document has changed. In an embodiment, the checksum is computed using Message Digest algorithm 5 (MD5), which computes a hash value that has a 128 bits. IDs 306*a-n* may include a version number, which may be used as a quick check as to whether the content of the document was changed. If the version number has changed, it is likely that content of the document has also changed. IDs 306*a-n* may be included within the metadata of, or otherwise embedded within documents 304*a-n*. In an embodiment, IDs 306*a-n* may be used as pointers to locations in a database where information about the document is stored. Server-Side Tracker 307 may track and update documents 304*a-n*. ID manager 308 creates IDs 306*a-n* and updates IDs 306*a-n* when there is a change to documents 304*a-n*.

Server-side updater 310 communicates with an application on one of network devices 318*a-m*. Server-side updater 310 receives requests to determine whether the user's version of a document is the most up-to-date version. Server-side updater 310 sends updates of documents to the user.

Compare 312 performs the comparison of an ID received from a user system 12 (FIG. 1) to one of IDs 306*a-n* to determine whether the user's copy of the corresponding one of documents 304*a-n* is the most recent. In an embodiment, a checksum may be performed to see if the document has changed. So that the value of the checksum embedded into the document does not affect a subsequent checksum of the document, before a checksum of the document is computed for the first time the identifier 000000000000 is embedded into the document, and the checksum is computed with this identifier present. Then this identifier is updated with the actual checksum of the document. When it is desired to recalculate the checksum to determine whether this document is the same as another, this document is temporarily updated by setting the checksum to all zeros. The checksum is then calculated with the temporary identifier. After the new checksum is computed, the new checksum is inserted into the document as the identifier. If the checksums are the same, then the two documents are the same. In other words, to prevent the value of the checksum from affecting the value of a new computation of the checksum, the current value of the checksum is temporarily removed, and the check sum is computed while the document contains all zeros for the checksum. The temporary value for the identifier does not need to be all zeros. The temporary value can be any value as long as the same value is used each time the checksum is created.

Server-side communications 314 handles communications with user systems 12. Server-side communications 314 may be an interface between server-side tracker 307 and network interface 20 and/or application servers $100_1$-$100_N$ (FIG. 2). Optionally, server-side communications 314 may also send a client-side tracker and installation software for installing the client-side tracker to the new users (e.g., one of network devices).

Database communications 316 handles communications with tenant storage 22 (FIG. 2). Database communications 316 may be an interface between server-side tracker and a database server for tenant storage 22.

Network devices 318*a-m* may be embodiments of user systems 12 (FIGS. 1 and 2). The icons used for network devices 318*a-m* are suggestive of many different types of network devices (e.g., network appliances), such as laptops, PCs, mobile phones, and PDAs.

Client-Side Tracker

Figure 4:
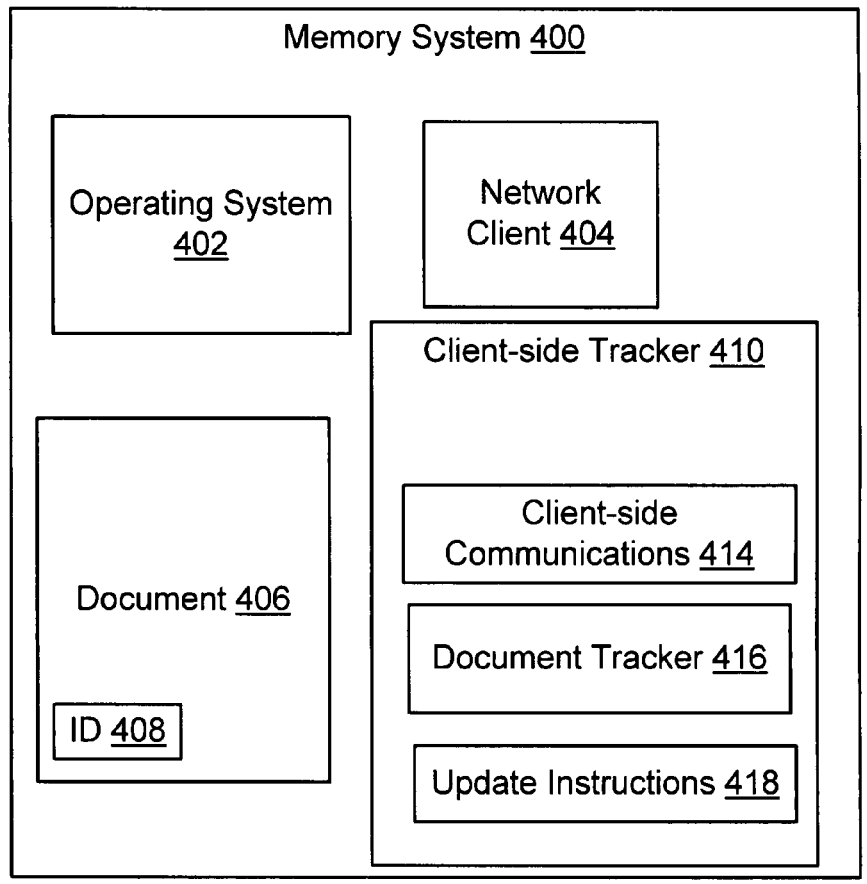
FIG. 4 illustrates a block diagram of an embodiment of the content stored in a memory system of a user system.

FIG. 4 shows a block diagram of the content stored in memory system 400. Memory system 400 may include operating system 402, network client 404, document 406, ID 408, and client-side tracker 410 having document tracker 412, client-side communications 414, document tracker 416, and update instructions 418. In other embodiments, memory 400 may not have all of the elements listed and/or may have other elements instead of or in addition to those listed.

Memory system 400 may be an embodiment of memory system 12B (FIG. 2), which was discussed above. Operating system 402 may include a set of one or more programs that manage the hardware and software resources of the one of network devices 318*a-m* within which memory system 400 is incorporated, by (for example) allocating and managing tasks and internal system resources as a service to users and programs of the system based on input from the user or from that network device.

Network client 404 is an interface for communicating with other systems via network 14. Network client 404 may use any of a variety of different protocols, such as HTTP, FTP, AFS, or WAP. In an embodiment network client 404 is a browser.

Document 406 may be a copy of a version of one of documents 304*a-n* (FIG. 3) that was downloaded from document management system 301. ID 408 may be a copy of a version of the one of IDs 306*a-n* (FIG. 3) that corresponds to the one of documents 304*a-n* of which document 406 is a copy. ID 408 may have a value that is, or corresponds to, the value that the corresponding one of IDs 306*a-n* had at the time that the user downloaded or last updated document 406.

Client-side tracker 410 is an application that may update (e.g., synchronize) document 406 to agree with the corresponding one of documents 304*a-n* (FIG. 3) and may track the opening of document 406. Client-side tracker 410 may be downloaded from document management system 301 (FIG. 3) upon the user joining an organization associated with tenant space 112 and/or upon downloading document 406. Client side tracker 410 may participate in downloading document 406 and may store the locations in memory system 400 where document 406 is stored. Optionally, client-side tracker 410 may track changes in where document 406 is stored. Client-side tracker 410 may monitor the user's system (which is one of network devices 318*a-m*) for when document 406 is opened, and then client side tracker 410 may send communications to document management system 301 to determine whether document 406 is up-to-date and/or whether the user desires updating document 406.

Client-side communications 414 handles communications with server-side communications 314. Client-side communications 414 sends a request to determine whether document 406 is up-to-date by at least sending ID 408 to document management system 301. Document tracker 416 the portion of code of client-side tracker 410 that tracks the location of the document 406 and monitors the user's system to determine whether document 406 was opened Document tracker 416 may monitor whether documents that were downloaded are open (or are being opened). Document tracker 416 may, at the file-system level, hook into disk level activity to determine when files are opened, by monitoring areas of memory associated with document 406. In another embodiment, a module may be integrated into the authoring application (such as Microsoft Word) that reads files being opened to determine whether the document being opened was downloaded from document management system 301. Update instructions 418 are instructions for updating document 406. Update instructions 418 may cause the overwriting of an old version of document 406 with a new version of document 406.

An ID

Figure 5:
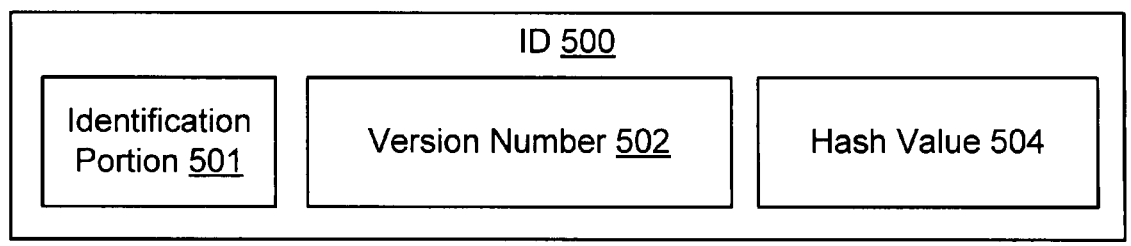
FIG. 5 illustrates a block diagram of an embodiment of an ID of FIG. 3.

FIG. 5 shows a block diagram of an embodiment of ID 500. ID 500 may include identification portion 501, version number 502 and hash value 504. In other embodiments, ID 500 may not have all of the elements listed and/or may have other elements instead of or in addition to those listed.

ID 500 is an embodiment of one of IDs 306a-n. Identification portion 501 identifies the document so that two versions of the same document may be associated within one another as two versions of the same document. In an embodiment, identification portion 501 may be used as a key for locating the document in tenant storage 22. Version number 502 is a value assigned to a current version of one of documents 306a-n. Each time one of documents 306a-n is updated version number 502 is changed. Hash value 504 is the output of a hash function applied to one of documents 306a-n. Hash value 504 may be a checksum of the entire document. Each time one of documents 306a-n is updated its hash value is recalculated. Changes in hash value 504 are indicative of changes in the content of the corresponding one of documents 306a-n.

Method for Client-Side Tracking

Figure 6:
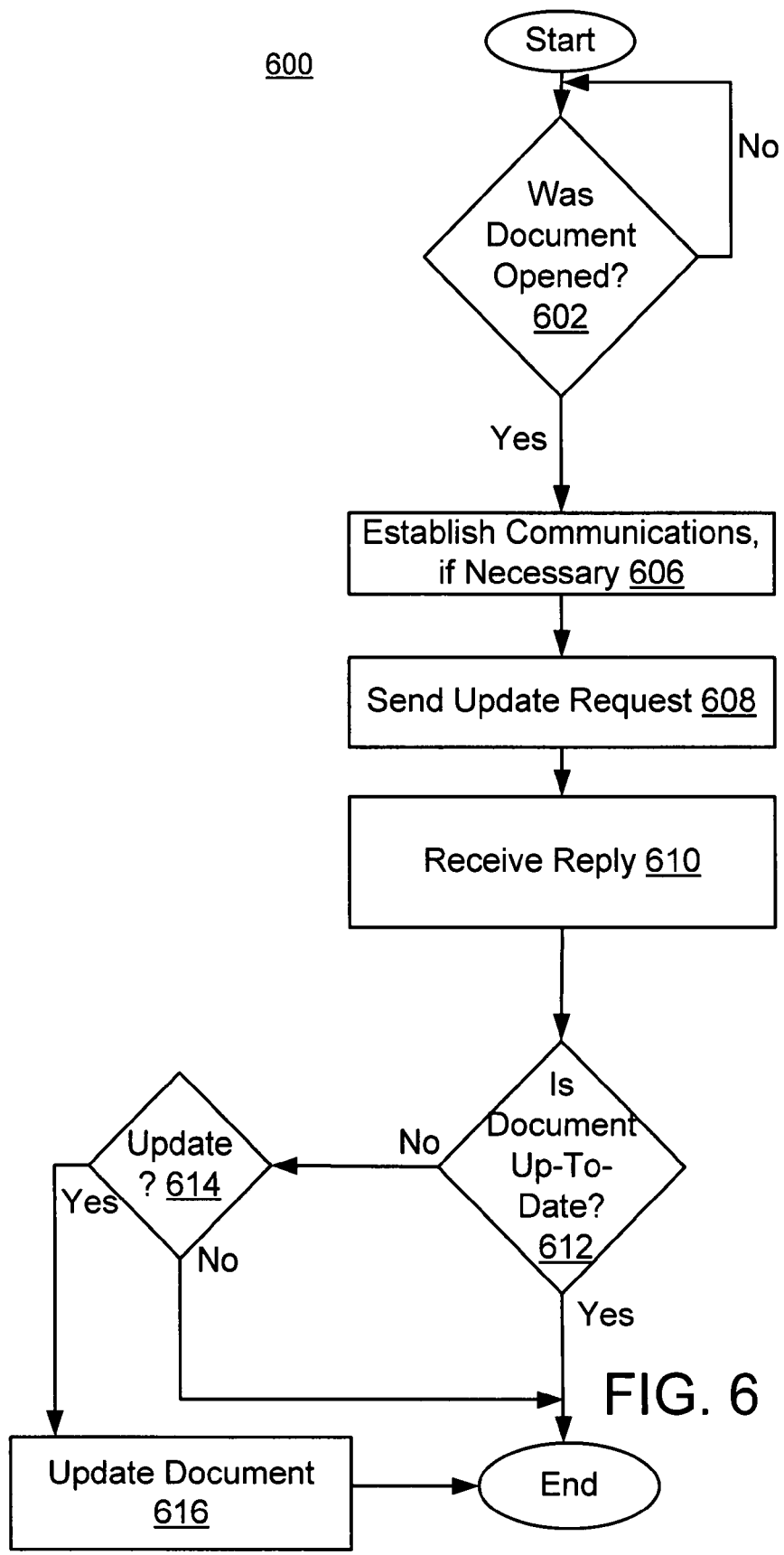
FIG. 6 illustrates a flowchart of an embodiment of a method carried out by the client-side tracker.

FIG. 6 shows a flowchart of an embodiment of a method 600 carried out by client-side tracker 410. Method 600 may start with one or more machine instruction causing client-side tracker 410 to start running as a service provided by operating system 402 (FIG. 4). In step 602, client-side tracker 410 checks whether document 406 was opened. Client-side tracker 410 (FIG. 4) may have certain memory addresses that are stored in associated with the location in memory of document 406. Client-side tracker 410 may limit client-side tracker 410's monitoring activities to the stored memory locations while monitoring the one of network applicants 316a-n (FIG. 3) that has document 406 to determine whether document 406 was opened. If step 602 determines that document 406 was not opened, step 602 is repeated. If step 602 determines that document 406 was opened, method 600 proceeds to step 606.

In step 606, client-side tracker 410 (FIG. 4) establishes, via network 14 (FIGS. 1-3), communications with document management system 301 (FIG. 3), if necessary. For example, if there currently is no network connection or no communications session occurring with server-side tracker 307, client-side tracker 410 may establish a network connection.

In step 608, client-side tracker 410 sends a message to document management system 301 (FIG. 3), requesting whether document 406 (FIG. 4) is current. The message sent as part of step 608 may include ID 408 for checking whether document 406 is up-to-date.

In step 610, a reply to the request is received. Step 610 may involve receiving an indication whether document 406 (FIG. 4) is up-to-date or is not up-to-date.

In step 612, a determination is made whether document 406 (FIG. 4) is up-to-date. If document 406 is up-to-date, then method 600 terminates. If document 406 is not up-to-date, method 600 proceeds to step 614.

In step 614, the user may be asked whether to update document 406. As part of set 614 or prior to step 614 the user may be given a choice of whether to (1) view the new version of the document, (2) compare the new version against the version the user has opened, and/or (3) update the version they have on their computer with the latest version. If the user does not want to update document 406, method 600 terminates. If the user does want to update document 406, then method 600 proceeds to step 616 where document 406 is updated. Next, method 600 terminates.

At any of the termination points of method 600, terminating method 600 may include restarting method 600, returning to step 602 and monitoring whether any documents that were downloaded from document management system 301 (FIG. 3) are opened. In an embodiment, each of the steps of method 600 is a distinct step. In another embodiment, although depicted as distinct steps in FIG. 6, the steps of method 600 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Figure 7:
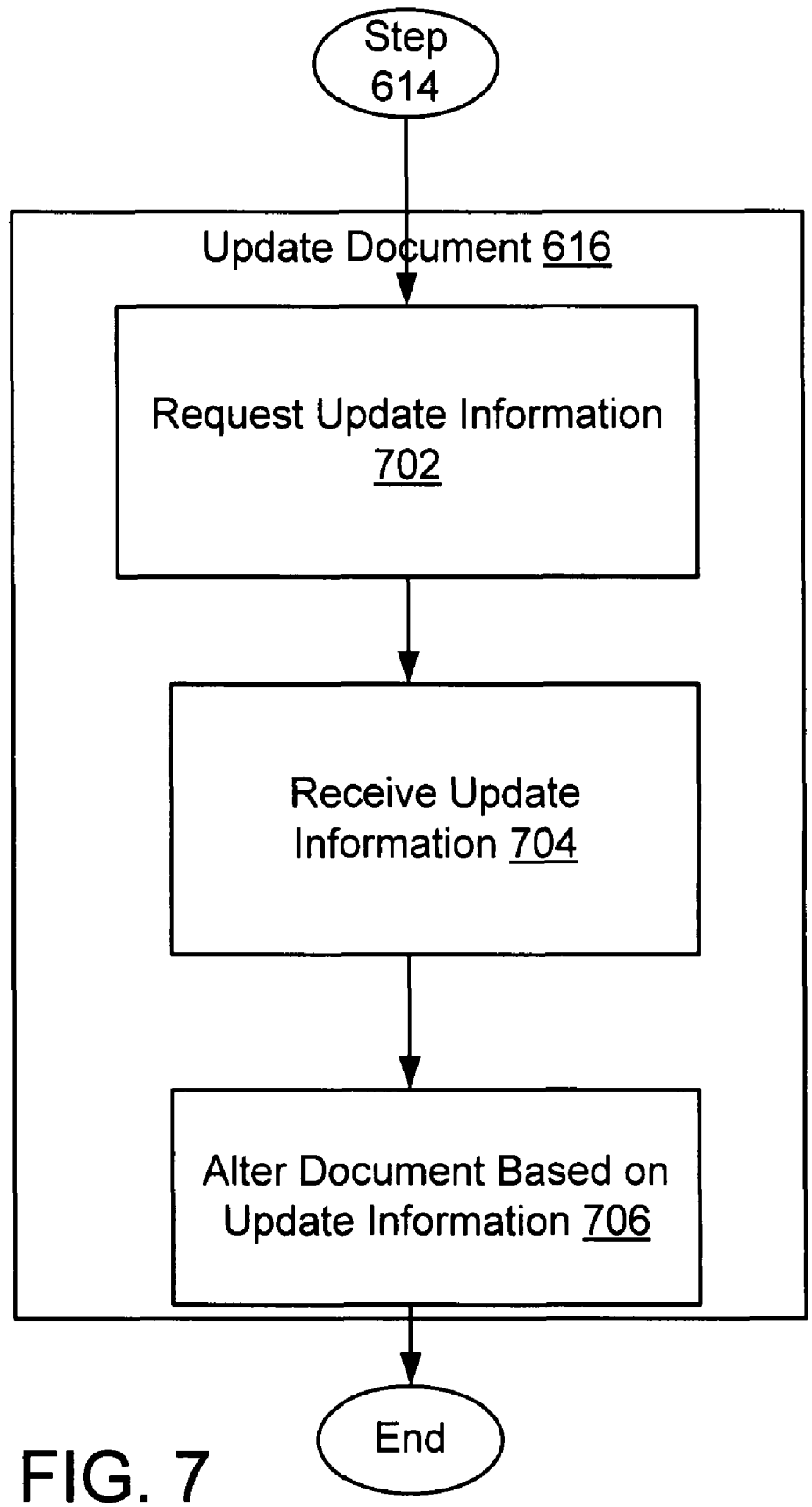
FIG. 7 is a flowchart of an embodiment of one of the steps of FIG. 6.

FIG. 7 is a flowchart of an example of step 616. In step 702, a request is sent to document management system 301 for an updated version of document 406 (FIG. 4). In step 704, the update for document 406 is received. In step 706, document 406 is updated (e.g., altered) based on the update received in step 704. Step 706 may involve overwriting the old version of document 406 with a new version (which may involve requesting and utilizing the stored path for the old version of document 406). After step 706, method 700 may terminate. In an embodiment, each of the steps of method 700 is a distinct step. In another embodiment, although depicted as distinct steps in FIG. 7, steps 702-706 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Method for Server-Side Tracking

Figure 8:
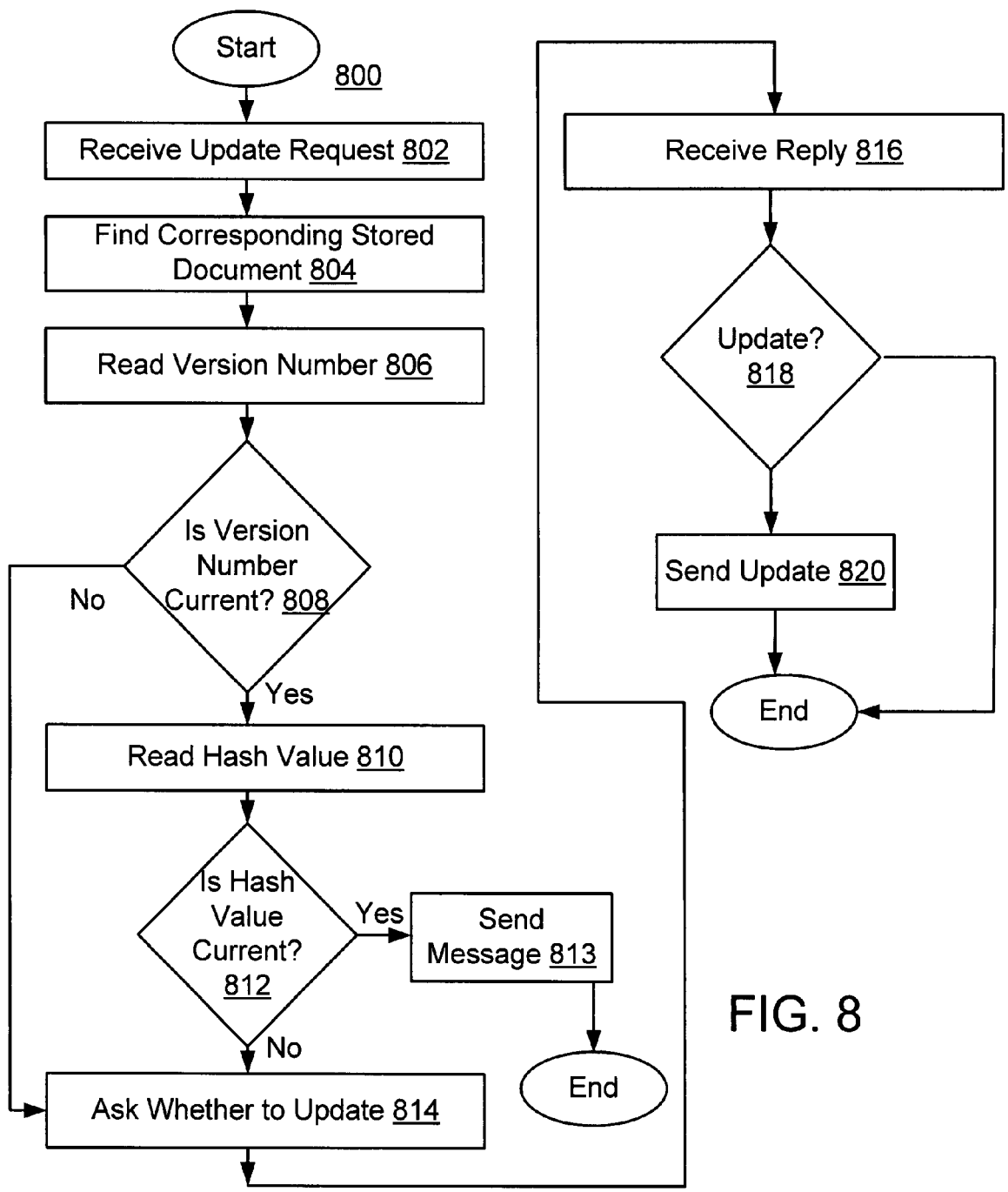
FIG. 8 illustrates a flowchart of an example of method for updating documents.

FIG. 8 shows a flowchart of an example of method 800. Method 800 is a method for updating document 406 (FIG. 4) that is implemented on the server-side, and may be implemented by server-side tracker 307 (FIG. 3). In step 802, a request is received from client-side tracker 410 to check if document 406 is up-to-date. In step 804, tenant data 114 is searched to find the document that corresponds to document 406. In step 806, the version number of the document is read from the document's ID. In step 808, a check is made as to whether the version number of document 406 is up-to-date based on the version number read. If the version number is up-to-date, method 800 proceeds to step 810, where the hash value is read of the document found in step 804. Next, method 800 proceeds to step 812, where a determination is made whether the hash value of document 406 is up-to-date based on the hash value read. For example, step 812 may involve checking whether a checksum of one documents 304*a-n* (FIG. 3) matches the checksum of document 406. If the hash values of the documents match, method 800 proceeds to step 813 where a message is sent to client-side tracker 410 that document 406 is up-to-date. After step 813, method 800 terminates.

Returning to step 812, if the hash values of the documents do not match, method 800 proceeds to step 814 where a message is sent to client-side tracker 410 asking whether to update document 406 (FIG. 4).

Returning to step 808, if the version number is not up-to-date, then method 800 proceeds to step 814 to check whether the user wants to update document 406 (FIG. 4).

Next in step 816, a reply is received from client-side tracker 410 (FIG. 4). In step 818, a determination is made as to whether the reply is to update document 406 (FIG. 4). If the reply is not to update, method 800 terminates. If the reply is to update, method 800 proceeds to step 820, where the update is sent to the user system. In an embodiment, each of the steps of method 800 is a distinct step. In another embodiment, although depicted as distinct steps in FIG. 8, steps 802-820 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

A Method for Placing Documents in a Document Management Storage

Figure 9:
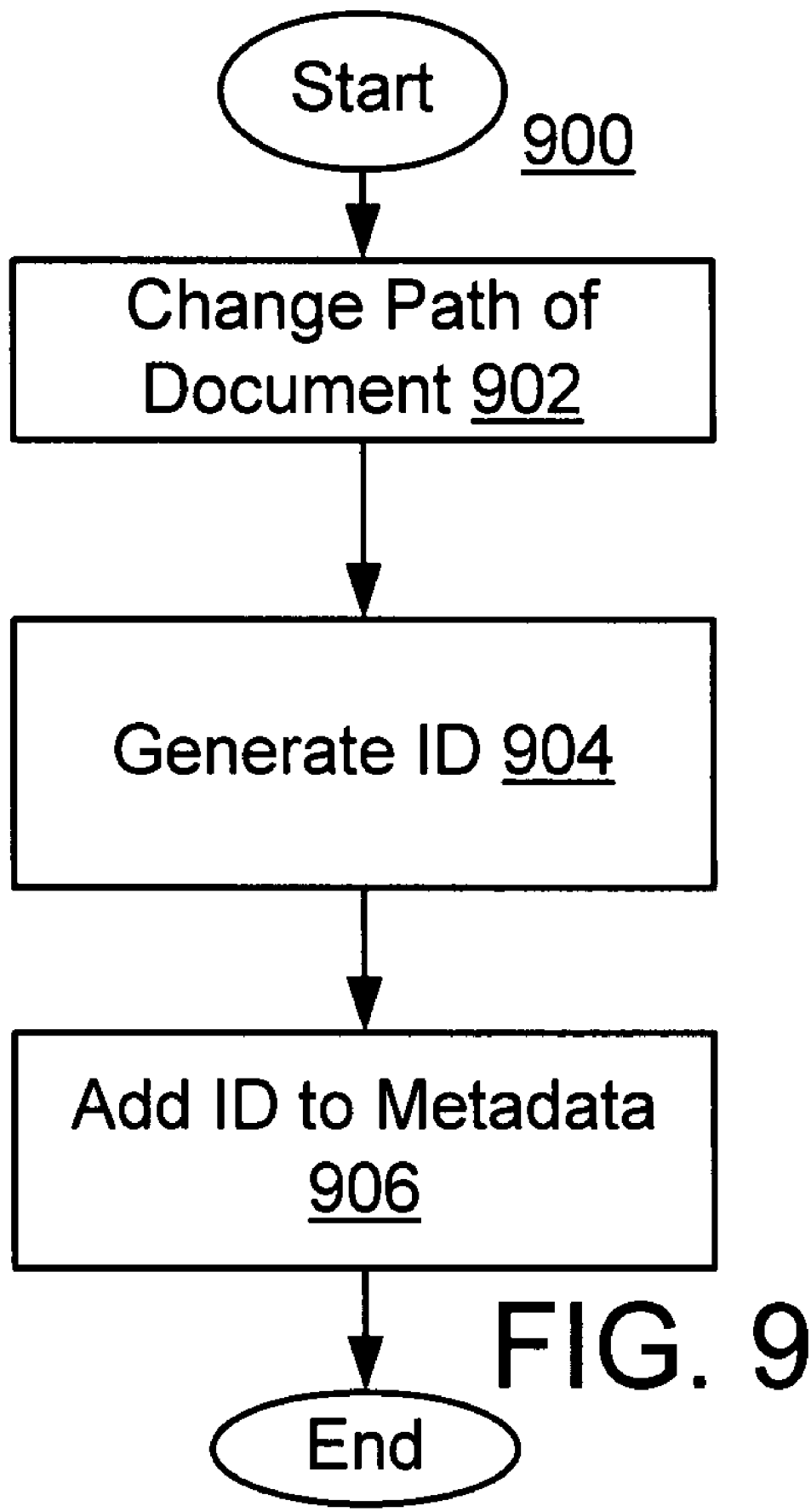
FIG. 9 illustrates a flowchart of an embodiment of a method of placing a document in a document management storage.

FIG. 9 shows a flowchart of an embodiment of a method 900 of placing a document in a document management storage. In step 902 the path of the document is changed so that the document is in the path of a resource shared by the group associated with the document management storage (e.g., the path is changed to include the document management storage in the path). If the document is on one of network devices 318*a-m*, the document is uploaded to document management system 301, and then the path is set to include the resource shared by the group (FIG. 3). In step 904, an ID is generated. Step 904 may involve generating identifier portion 501, version number 502, and hash value 504 (FIG. 5). In step 906, the ID is added to the metadata of the document and/or otherwise embedded in the document. In an embodiment, each of the steps of method 900 is a distinct step. In another embodiment, although depicted as distinct steps in FIG. 9, step 902-906 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Figure 10:
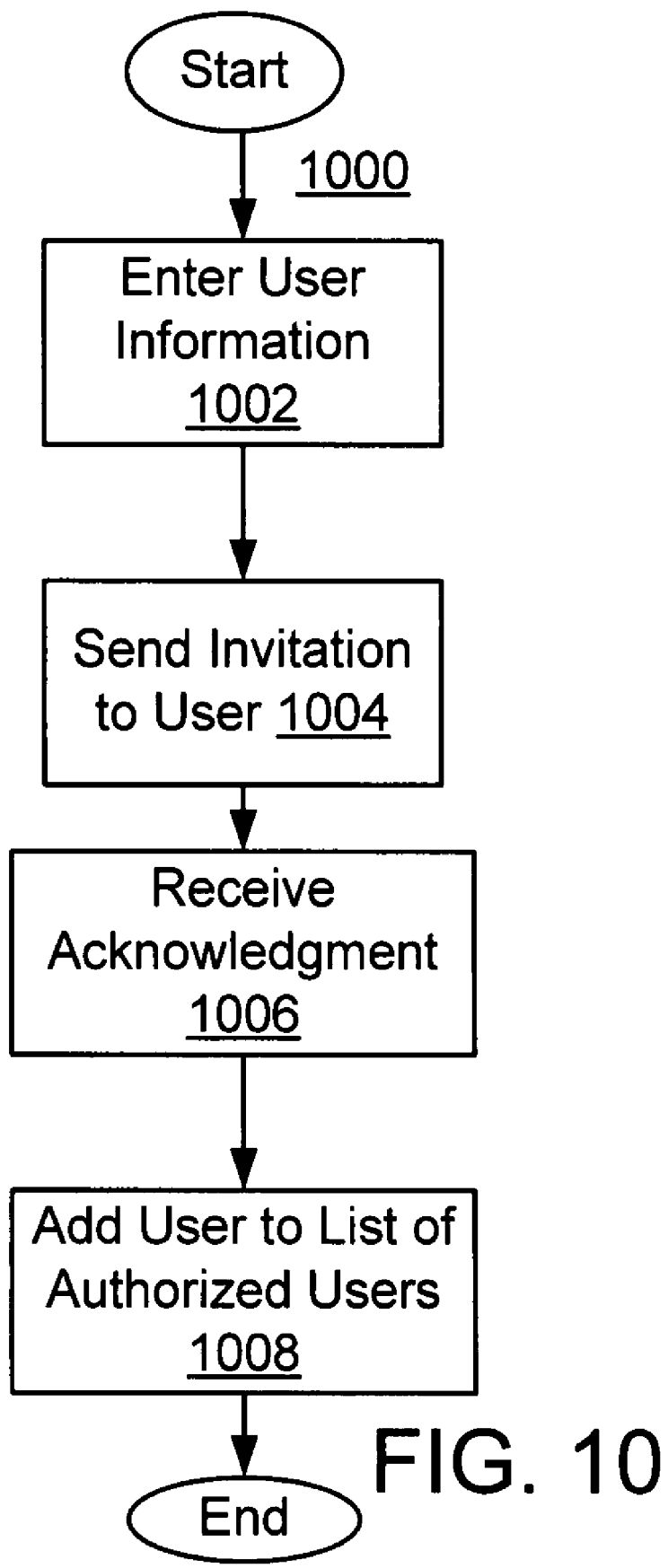
FIG. 10 illustrates a flowchart of an embodiment of a method of inviting a new member to join a group that has access to the document management storage.

A Method of Inviting a New Member to Join a Group that has Access to the Document Management Storage FIG. 10 is a flowchart of an embodiment of a method 1000 of inviting a new member to join a group that has access to the document management storage. In step 1002, information about the user is added to document management system 301 (FIG. 3). In step 1004, an invitation is sent to the user to join the group. Included in the invitation may be instructions for installing client-side tracker 410 (FIG. 4) on the user's system. The instructions may include a link from where client-side tracker 410 may be downloaded. Alternatively, the invitation may include a link that initiates the downloading of client-side tracker 410. In step 1006, optionally, document management system 301 receives an acknowledgement that the invitation was accepted. In step 1008, the user is added to a list of users authorized to access the document management storage. In an embodiment, each of the steps of method 1000 is a distinct step. In another embodiment, although depicted as distinct steps in FIG. 10, step 1002-1008 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
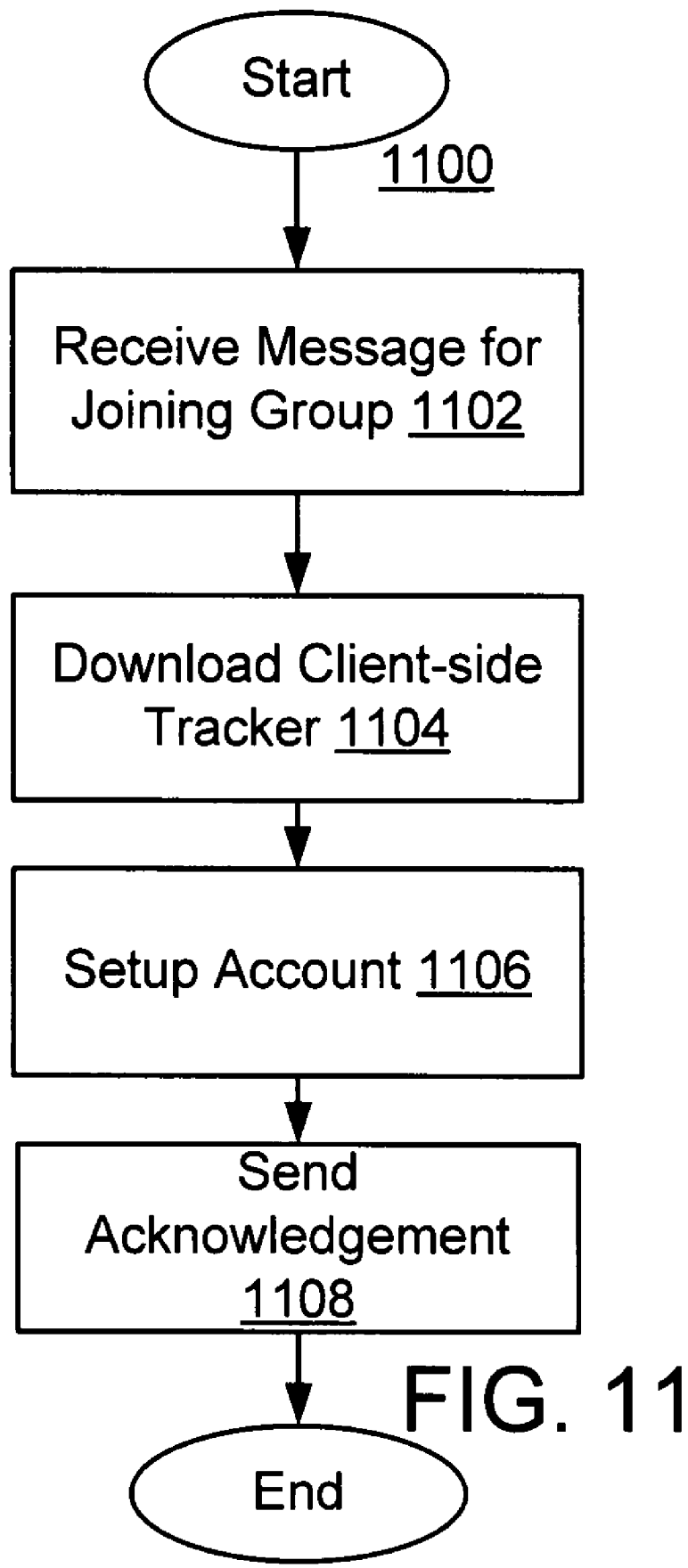
FIG. 11 illustrates a flowchart of an embodiment of a method of accepting an invitation to join a group that has access to a document management storage where shared documents are stored.

A Method of Accepting an Invitation to Join a Group that has Access to the Document Management Storage FIG. 11 is a flowchart of an embodiment of a method 1100 of accepting an invitation to join a group that has access to a document management storage where shared documents are stored. In step 1102, a user receives the message sent via method 1000 for joining the group. In step 1104, the user downloads client-side tracker onto the user's system. In optional step 1106, the user sets up an account by entering login information, such as a password, into document management system 301 (FIG. 3). In optional step 1108, an acknowledgment is sent from the user system to document management system 301. The sending of the acknowledgement may follow automatically at the conclusion of downloading client-side tracker 410 (FIG. 4) and/or setting up an account. In an embodiment, each of the steps of method 1100 is a distinct step. In another embodiment, although depicted as distinct steps in FIG. 1, steps 1102-1108 may not be distinct steps. In other embodiments, method 1100 may not have any of the above steps and/or may have other steps in addition to or instead of those listed above. The steps of method 1100 may be performed in another order. Subsets of the steps listed above as part of method 1100 may be used to form their own method.

Method for Using the Environment (FIGS. 1 and 2)

Figure 12:
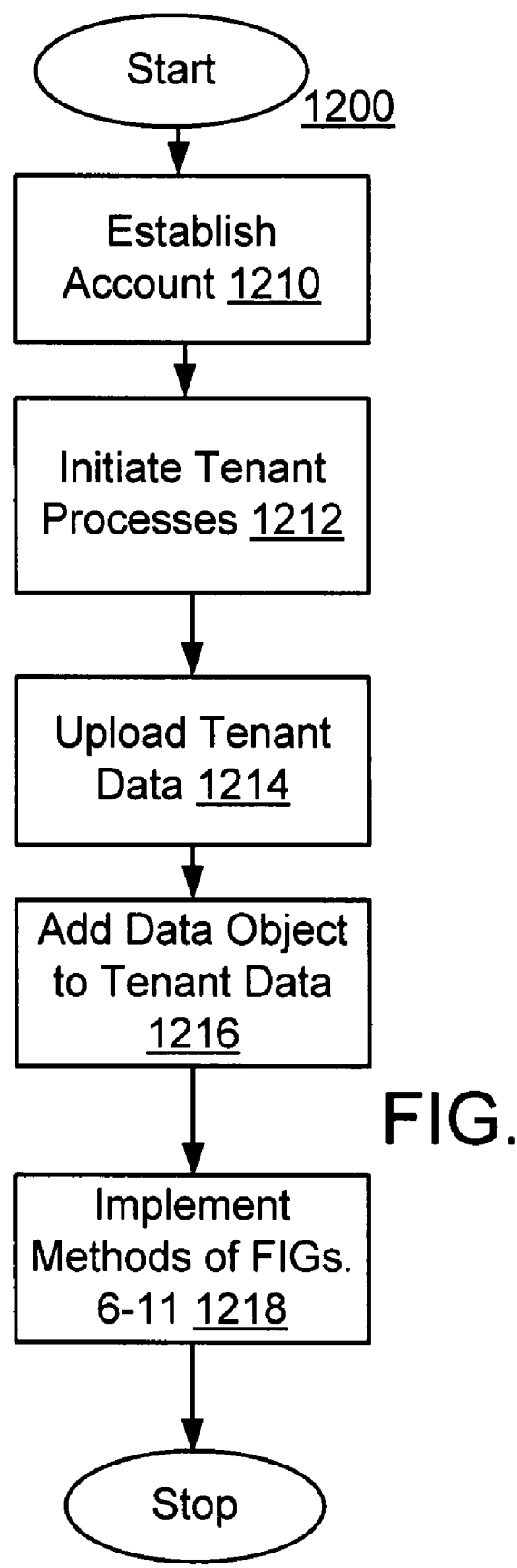
FIG. 12 illustrates a flowchart of an embodiment of a method of using environment 10.

FIG. 12 shows a flowchart of an example of a method 1200 of using environment 10. In step 1210, user system 12 (FIGS. 1 and 2) establishes an account. In step 1212, one more tenant process space 104 (FIG. 2) are initiated on behalf of user system 12, which may also involve setting aside space in tenant space 112 (FIG. 2) and tenant data 114 (FIG. 2) for user system 12. Step 1212 may also involve modifying application metadata to accommodate user system 12. In step 1214, user system 12 uploads data. In step 1216, one or more data objects are added to tenant data 114 where the uploaded data is stored. In step 1218, methods 600-1100 may be implemented. The user of method 1200 represent an organization that is a tenant of system 16 (FIG. 1), which the users of methods 600-1100 may just be associated with the tenant. In an embodiment, each of the steps of method 1200 is a distinct step. In another embodiment, although depicted as distinct steps in FIG. 12, steps 1202-1218 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method.

Method for Creating the Environment (FIGS. 1 and 2)

Figure 13:
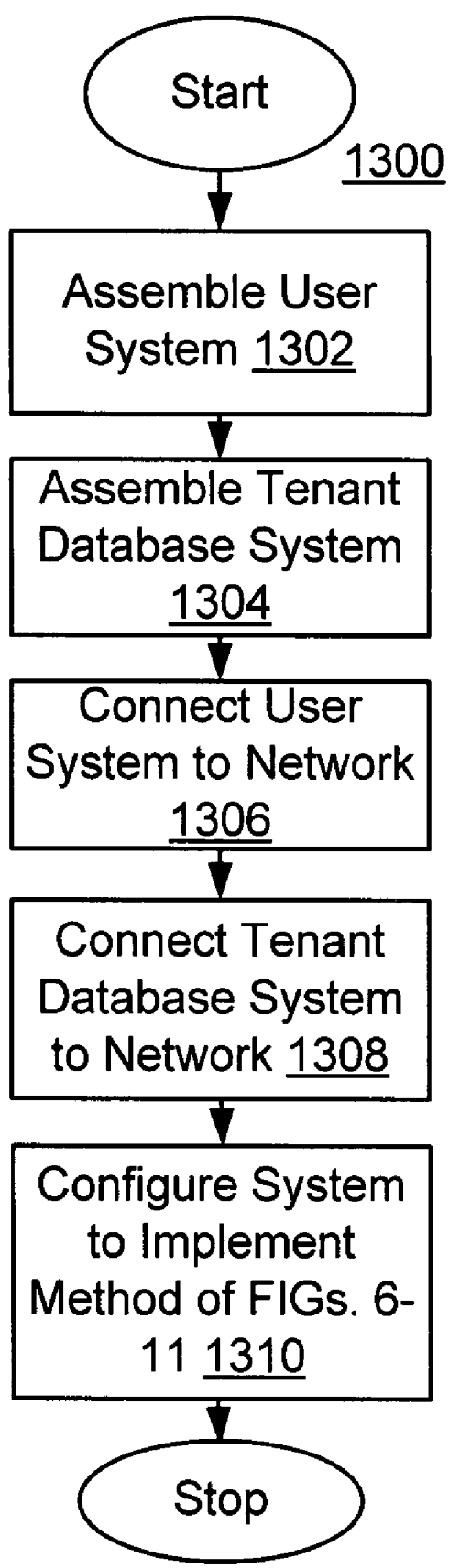
FIG. 13 illustrates a flowchart of a method of making the environment of FIG. 1.

FIG. 13 is a method of making environment 10, in step 1302, user system 12 (FIGS. 1 A*nd* 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1304, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100₁-100_N, system process space 102, tenant process spaces 104, tenant management process space 110, tenant space 112, tenant data 114, and application metadata 116 (FIG. 2).

In step 1306, user system 12 is communicatively coupled to network 104. In step 1308, system 16 is communicatively coupled to network 104 allowing user system 12 and system 16 to communicate with one another (FIG. 2). In step 1310, one or more instructions may be installed in system 16 (e.g., the instructions may be installed on one or more machine readable media, such as computer readable media, therein) and/or system 16 is otherwise configured for performing the steps of methods 600-1100. For example, as part of step 1310, one or more instructions may be entered into the memory of system 16 for creating document management storage 302, transferring documents to the document management storage, implementing server-side tracker 307, generating and updating IDs 306a-n, and/or inviting users to join a group that is authorized to access the document management storage 302 (FIG. 3). In an embodiment, each of the steps of method 1300 is a distinct step. In another embodiment, although depicted as distinct steps in FIG. 13, steps 1302-1308 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Extensions and Alternatives

In an embodiment, a timestamp of the last time that the document was altered may be included in ID 500 instead of, or in addition to, version number 502 and/or hash value 504 (FIG. 5). In an embodiment, only one of version number 502 and hash value 504 is included in ID 500. In an embodiment, version number 502 is a value that is incremented every time that that document is altered. In an embodiment, version number 502 is a value that is decremented every time that a document is altered.

In an embodiment only the latest approved version of a document is available for viewing by users. For example, a first user downloads a document to their user system. Then a second user updates the document in the system. System 16 may be configured to route document changes entered by the second user to a workflow, so that document changes can be approved before being published. While the document in undergoing an approval workflow (in other words, prior to the changes being approved), if the first user opens the document the first user will not be notified of any of the changes made by the second user, because the first user is still viewing the latest approved document. When the document is approved, the first user would be notified if the document is opened on the first user's desktop.

In an embodiment, the downloading of a document from document management storage 302 (FIG. 3) to the user's system may entail the following steps on the client side. In one of the steps the user sends a request for a copy of one of documents 304a-n (FIG. 3). In one of the steps, the user's system receives a copy of the document (document 406 of FIG. 4). In one of steps the document is stored in a location in memory 400 (FIG. 4). In one of the steps client-side tracker 410 (FIG. 4) records the location of where document 400 is located, so that client-side tracker only needs to monitor the locations to where the documents were downloaded in order to determine whether one of the documents downloaded from document management system 301 (FIG. 3) was opened. In another embodiment, upon installation or at another time, the user designates a particular location where all documents that were downloaded from document management system 301 will be stored, and when downloading a document from document management system 301, client-side tracker 410 ensures that the document is stored in the designated location. Alternatively, client-side tracker 410 tracks the entire user system or is triggered to launch by the opening of document 406 (FIG. 4). In an embodiment, the client-side tracker 410 may include a file browser for browsing documents in the document management storage.

In method 600, in an embodiment, instead of method 600 proceeding from step 602 to step 606 (FIG. 6), a message may be sent to the user asking whether to update document 406 (FIG. 4). If the user responds that document 406 should not be updated, then method 600 terminates. If the user responds document 406 should be updated, method 600 proceeds to step 606. In other words, a request may be presented to the user asking whether to update document 406 before and/or after a check is made as to whether document 406 is up-to-date.

In an alternative embodiment, step 610 (FIG. 6) may involve receiving an updated version of document 406 having a new ID 408, instead of, or in addition to, sending a message if document 406 was out of date (FIG. 4). In an alternative embodiment, as soon as the user turns on one of network device 318a-m a network connection is established and a check is made as whether the master document for document 406 was updated, and if the master document was updated a message is sent to the user asking if the user wants to update the document. In an alternative embodiment, Although in the embodiments of FIGS. 6 and 7, client-side tracker 410 sending ID 408 to document management system 301 and then having server-side tracker 307 perform the comparison of IDs to determine whether document 406 is up-to-date, in an alternative embodiment, in response to a request from the client-side tracker 410, server-side tracker 307 sends the corresponding ID (of the master copy of the document corresponding to document 406) to the user's system, and then client side tracker determines whether document 406 is up-to-date based on ID 408 and the ID received from the document management system 301 (FIGS. 3 and 4). Then, if document 406 is not up-to-date, the user is asked whether an update is desired or in another embodiment, the updated version of document 406 is automatically downloaded without consulting the use.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for tracking documents stored on behalf of a plurality of organizations, comprising:
   receiving at a host system, an original document to store on behalf of a first organization;
   storing a copy of the original document to a document management storage in a storage accessible to the host system; and
   tracking, at the host system, the original document and the copy of the original document in the document management storage by a unique identifier assigned to the original document and a corresponding unique identifier assigned to the copy of the original document stored in the document management storage;
   wherein the unique identifier assigned to the copy of the original document stored in the document management storage is tracked using a portion of a database resident at the host system limited to information of the first organization, wherein more than one user from the first organization has the ability to freely edit the document.

2. The method for tracking documents of claim 1, wherein the host system is a multi-organizational, on-demand database.

3. A method for tracking documents stored on behalf of a plurality of organizations, comprising:
   receiving at a host system, an original document to store on behalf of a first organization;
   storing a copy of the original document to a document management storage in a storage accessible to the host system; and
   tracking, at the host system, the original document and the copy of the original document in the document management storage by a unique identifier assigned to the original document and a corresponding unique identifier assigned to the copy of the original document stored in the document management storage;
   wherein the unique identifier assigned to the copy of the original document stored in the document management storage is tracked using a portion of a database resident at the host system limited to information of the first organization;
   the method further comprising:
   applying a hash function to the original document, therein generating a hash value, and including the hash value within the unique identifier.

4. The method of claim 3, wherein the applying of the hash function and the including of the hash value in the unique identifier are performed in association with the storing of the original document in the document management storage.

5. The method of claim 3, further comprising:
   revising the original document;
   repeating the applying of the hash function, therein computing a new hash value; and
   revising the unique identifier by at least replacing the hash value within the unique identifier with the new hash value.

6. The method of claim 3, further comprising the hash value being a checksum of the original document.

7. A method for tracking documents stored on behalf of a plurality of organizations, comprising:
   receiving at a host system, an original document to store on behalf of a first organization;
   storing a copy of the original document to a document management storage in a storage accessible to the host system; and
   tracking, at the host system, the original document and the copy of the original document in the document management storage by a unique identifier assigned to the original document and a corresponding unique identifier assigned to the copy of the original document stored in the document management storage;
   wherein the unique identifier assigned to the copy of the original document stored in the document management storage is tracked using a portion of a database resident at the host system limited to information of the first organization;
   the method further comprising the unique identifier also being a version number, the unique identifier at least including a pointer to a location in a database where information about the document is stored.

8. A method for tracking documents stored on behalf of a plurality of organizations, comprising:
   receiving at a host system, an original document to store on behalf of a first organization;
   storing a copy of the original document to a document management storage in a storage accessible to the host system; and
   tracking, at the host system, the original document and the copy of the original document in the document management storage by a unique identifier assigned to the original document and a corresponding unique identifier assigned to the copy of the original document stored in the document management storage;
   wherein the unique identifier assigned to the copy of the original document stored in the document management storage is tracked using a portion of a database resident at the host system limited to information of the first organization;
   the method further comprising:
   sending a message to a user inviting the user to join a group of users that have authorization to access the document management storage, the message including at least instructions for installing an application on a user system for checking whether documents on the user system are current.

9. A method for tracking documents stored on behalf of a plurality of organizations, comprising:
   receiving at a host system, an original document to store on behalf of a first organization;
   storing a copy of the original document to a document management storage in a storage accessible to the host system; and
   tracking, at the host system, the original document and the copy of the original document in the document management storage by a unique identifier assigned to the original document and a corresponding unique identifier assigned to the copy of the original document stored in the document management storage;
   wherein the unique identifier assigned to the copy of the original document stored in the document management storage is tracked using a portion of a database resident at the host system limited to information of the first organization;
   the method further comprising:

receiving a message from a user system including at least the unique identifier;

in response, checking whether a document stored at a user system is current, based on the unique identifier sent and a unique identifier stored with the original document, the document stored on the user system being a copy of the original document.

10. The method of claim 9, further comprising:

if it is determined that the document stored at the user system is not current, sending a message to the user requesting whether to send an update for the document stored on the user system.

11. The method of claim 9, further comprising:

if it is determined that the document stored at the user system is not current and if the user requests to update the document stored in the user system, sending the original document to the user.

12. A method for tracking documents stored on behalf of a plurality of organizations, comprising:

receiving at a host system, an original document to store on behalf of a first organization;

storing a copy of the original document to a document management storage in a storage accessible to the host system; and tracking, at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization;

the method further comprising:

applying a hash function to the original document, therein generating a hash value, which is a checksum of the document;

assigning a version number to the original document, storing the original document in the document management storage;

including the hash value and version number within the unique identifier in association with the storing of the original document;

embedding the unique identifier within the original document;

revising the original document;

repeating the applying of the hash function, therein computing a new hash value, and repeating the assigning of the version number;

revising the unique identifier by at least replacing the hash value within the unique identifier with the new hash value;

repeating the embedding;

sending a message to a user inviting the user to join a group of users that have authorization to access the document management storage, the message including at least instructions for installing an application on a user system for checking whether documents on the user system are current;

receiving a message from the user system including at least the unique identifier;

in response, checking whether a document stored at the user system is current, based on the unique identifier sent and a unique identifier stored with the original document, the document stored on the user system being a copy of the original document; and if it is determined that the document stored at the user system is not current and if the user requests to update the document stored in the user system, sending the original document to the user.

13. A method comprising:

receiving a copy of an original document from a document management storage on another system that serves multiple organizations, the copy including a unique identifier; and tracking the copy by at least monitoring when the copy is opened, when it is detected that the copy is opened, sending a message to the other system that includes at least the unique identifier, and waiting to receive a reply to the message indicating whether the copy is current, the reply being based on the unique identifier sent in the message and a corresponding unique identifier in the original document, wherein more than one user from the organization has the ability to freely edit the document.

14. A host system comprising one or more computer readable media storing thereon a storage area for storing master copies of documents for a first organization having unique identifiers embedded within the master copies; and one or more machine instructions for a method including at least:

generating the unique identifiers, revising the unique identifiers when the master copies are altered, embedding the unique identifiers in the master copies, and determining whether a copy of a master copy is current based on a unique identifier embedded in the master copy and a unique identifier embedded in the copy of the master copy, wherein more than one user from the first organization has the ability to freely edit the document.

15. A host system comprising one or more computer readable media storing thereon a storage area for storing master copies of documents for a first organization having unique identifiers embedded within the master copies; and one or more machine instructions for a method including at least:

generating the unique identifiers, revising the unique identifiers when the master copies are altered, embedding the unique identifiers in the master copies, and determining whether a copy of a master copy is current based on a unique identifier embedded in the master copy and a unique identifier embedded in the copy of the master copy; wherein the host system is a multi-organizational on-demand database; the host system further comprising: the one or more machine instructions including at least one or more machine instructions for inviting a user to join a group of users that have authorization to access the storage area, the one or more machine instructions for inviting including at least one or more machine instructions for sending user instructions for downloading an application that tracks copies of the master copies.

16. The host system of claim 14, wherein the host system is a multi-organizational on-demand database.

17. A host system comprising one or more computer readable media storing thereon a storage area for storing master copies of documents for a first organization having unique identifiers embedded within the master copies; and
- one or more machine instructions for a method including at least:
  - generating the unique identifiers,
  - revising the unique identifiers when the master copies are altered,
  - embedding the unique identifiers in the master copies, and
  - determining whether a copy of a master copy is current based on a unique identifier embedded in the master copy and a unique identifier embedded in the copy of the master copy wherein the host system is a multi-organizational on-demand database, further comprising an on-demand multi-tenant database having a tenant storage area for each tenant, the storage area being located within a storage area of a tenant.

18. A computer readable medium storing thereon one or more instruction for implementing a method for tracking documents stored on behalf of a plurality of organizations, the method comprising:
- receiving at a host system, an original document to store on behalf of a first organization;
- storing a copy of the original document to a document management storage in a storage accessible to the host system; and
- tracking, at the host system, the original document and the copy of the original document in the document management storage by a unique identifier assigned to the original document and a corresponding unique identifier assigned to the copy of the original document stored in the document management storage;
- wherein the unique identifier assigned to the copy of the original document stored in the document management storage is tracked using a portion of a database resident at the host system limited to information of the first organization, wherein more than one user from the first organization has the ability to freely edit the document.

19. A computer readable medium storing thereon one or more instruction for implementing a method for tracking documents stored on behalf of a plurality of organizations, the method comprising:
- receiving at a host system, an original document to store on behalf of a first organization;
- storing a copy of the original document to a document management storage in a storage accessible to the host system; and
- tracking, at the host system, the original document and the copy of the original document in the document management storage by a unique identifier assigned to the original document and a corresponding unique identifier assigned to the copy of the original document stored in the document management storage;
- wherein the unique identifier assigned to the copy of the original document stored in the document management storage is tracked using a portion of a database resident at the host system limited to information of the first organization;
- the method further comprising:
- applying a hash function to the original document, therein generating a hash value, and including the hash value within the unique identifier.

20. The computer readable medium of claim 19, wherein, the applying of the hash function and the including of the hash value in the unique identifier are performed in association with the storing of the original document in the document management storage.

21. The computer readable medium of claim 19, the method further comprising:
- revising the original document;
- repeating the applying of the hash function, therein computing a new hash value; and
- revising the unique identifier by at least replacing the hash value within the unique identifier with the new hash value.

22. The computer readable medium of claim 19, wherein, the hash value is a checksum of the original document.

23. A computer readable medium storing thereon one or more instruction for implementing a method for tracking documents stored on behalf of a plurality of organizations, the method comprising:
- receiving at a host system, an original document to store on behalf of a first organization;
- storing a copy of the original document to a document management storage in a storage accessible to the host system; and
- tracking, at the host system, the original document and the copy of the original document in the document management storage by a unique identifier assigned to the original document and a corresponding unique identifier assigned to the copy of the original document stored in the document management storage;
- wherein the unique identifier assigned to the copy of the original document stored in the document management storage is tracked using a portion of a database resident at the host system limited to information of the first organization;
- the method further comprising:
- assigning a version number to the original document, and including the version number within the unique identifier.

24. A computer readable medium storing thereon one or more instruction for implementing a method for tracking documents stored on behalf of a plurality of organizations, the method comprising:
- receiving at a host system, an original document to store on behalf of a first organization;
- storing a copy of the original document to a document management storage in a storage accessible to the host system; and
- tracking, at the host system, the original document and the copy of the original document in the document management storage by a unique identifier assigned to the original document and a corresponding unique identifier assigned to the copy of the original document stored in the document management storage;
- wherein the unique identifier assigned to the copy of the original document stored in the document management storage is tracked using a portion of a database resident at the host system limited to information of the first organization;
- the method further comprising:
- sending a message to a user inviting the user to join a group of users that have authorization to access the document management storage, the message including at least instructions for installing an application on a user system for checking whether documents on the user system are current.

25. A computer readable medium storing thereon one or more instruction for implementing a method for tracking documents stored on behalf of a plurality of organizations, the method comprising:
- receiving at a host system, an original document to store on behalf of a first organization;

storing a copy of the original document to a document management storage in a storage accessible to the host system; and tracking, at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization;

the method further comprising:

receiving a message from a user system including at least the unique identifier;

in response, checking whether a document stored at a user system is current, based on the unique identifier sent and a unique identifier stored with the original document, the document stored on the user system being a copy of the original document.

26. The computer readable medium of claim 25, the method further comprising:

if it is determined that the document stored at the user system is not current, sending a message to the user requesting whether to send an update for the document stored on the user system.

27. The computer readable medium of claim 25, the method further comprising:

if it is determined that the document stored at the user system is not current and if the user requests to update the document stored in the user system, sending the original document to the user.

28. A computer readable medium storing thereon one or more instruction for implementing a method for tracking documents stored on behalf of a plurality of organizations, the method comprising:

receiving at a host system, an original document to store on behalf of a first organization;

storing a copy of the original document to a document management storage in a storage accessible to the host system; and tracking, at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization;

the method further comprising:

applying a hash function to the original document, therein generating a hash value, which is a checksum of the document;

assigning a version number to the original document, storing the original document in the document management storage;

including the hash value and version number within the unique identifier in association with the storing of the original document;

embedding the unique identifier within the original document;

revising the original document;

repeating the applying of the hash function, therein computing a new hash value, and repeating the assigning of the version number;

revising the unique identifier by at least replacing the hash value within the unique identifier with the new hash value;

repeating the embedding;

sending a message to a user inviting the user to join a group of users that have authorization to access the document management storage, the message including at least instructions for installing an application on the user system for checking whether documents on the user system are current;

receiving a message from the user system including at least the unique identifier;

in response, checking whether a document stored at the user system is current, based on the unique identifier sent and a unique identifier stored with the original document, the document stored on the user system being a copy of the original document; and if it is determined that the document stored at the user system is not current and if the user requests to update the document stored in the user system, sending the original document to the user.

29. A host system for tracking documents stored on behalf of a plurality of organizations, the system comprising:

a database system having
a processor system,
volatile memory, and
non-volatile memory;

the non-volatile memory including at least one machine readable medium carrying one or more sequences of instructions which when implemented causes the processor system to implement a method comprising:

receiving at the host system, an original document to store on behalf of a first organization;

storing a copy of the original document to a document management storage in a storage accessible to the host system; and tracking at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization, wherein more than one user from the first organization has the ability to freely edit the document.

30. A host system for tracking documents stored on behalf of a plurality of organizations, the system comprising:

a database system having
a processor system,
volatile memory, and
non-volatile memory;

the non-volatile memory including at least one machine readable medium carrying one or more sequences of instructions which when implemented causes the processor system to implement a method comprising:

receiving at the host system, an original document to store on behalf of a first organization;

storing a copy of the original document to a document management storage in a storage accessible to the host system; and tracking at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization;

the method further comprising:

applying a hash function to the original document, therein generating a hash value, and including the hash value within the unique identifier.

31. The host system of claim 30, the applying of the hash function and the including of the hash value in the unique identifier are performed in association with the storing of the original document in the document management storage.

32. The host system of claim 30, the method further comprising:

revising the original document;

repeating the applying of the hash function therein computing a new hash value; and revising the unique identifier by at least replacing the hash value within the unique identifier with the new hash value.

33. The host system of claim 30, the hash value being a checksum of the original document.

34. A host system for tracking documents stored on behalf of a plurality of organizations, the system comprising:

a database system having
  a processor system,
  volatile memory, and
  non-volatile memory;

the non-volatile memory including at least one machine readable medium carrying one or more sequences of instructions which when implemented causes the processor system to implement a method comprising:

receiving at the host system, an original document to store on behalf of a first organization;

storing a copy of the original document to a document management storage in a storage accessible to the host system; and tracking at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization, the unique identifier also being a version number, the unique identifier at least including a pointer to a location in a database where information about the document is stored.

35. A host system for tracking documents stored on behalf of a plurality of organizations, the system comprising:

a database system having
  a processor system,
  volatile memory, and
  non-volatile memory;

the non-volatile memory including at least one machine readable medium carrying one or more sequences of instructions which when implemented causes the processor system to implement a method comprising:

receiving at the host system, an original document to store on behalf of a first organization;

storing a copy of the original document to a document management storage in a storage accessible to the host system; and tracking at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization;

the method further comprising:

sending a message to a user inviting the user to join a group of users that have authorization to access the document management storage, the message including at least instructions for installing an application on a user system for checking whether documents on the user system are current.

36. A host system for tracking documents stored on behalf of a plurality of organizations, the system comprising:

a database system having
  a processor system,
  volatile memory, and
  non-volatile memory;

the non-volatile memory including at least one machine readable medium carrying one or more sequences of instructions which when implemented causes the processor system to implement a method comprising:

receiving at the host system, an original document to store on behalf of a first organization;

storing a copy of the original document to a document management storage in a storage accessible to the host system; and tracking at the host system, the original document and the copy of the original document in the document management storage by a unique identifier assigned to the original document and a corresponding unique identifier assigned to the copy of the original document stored in the document management storage;

wherein the unique identifier assigned to the copy of the original document stored in the document management storage is tracked using a portion of a database resident at the host system limited to information of the first organization;

the method further comprising:

receiving a message from a user system including at least the unique identifier;

in response, checking whether a document stored at a user system is current, based on the unique identifier sent and a unique identifier stored with the original document, the document stored on the user system being a copy of the original document.

37. The host system of claim 36, the method further comprising:

if it is determined that the document stored at the user system is not current, sending a message to the user requesting whether to send an update for the document stored on the user system.

38. The host system of claim 36, the method further comprising:

if it is determined that the document stored at the user system is not current and if the user requests to update the document stored in the user system, sending the original document to the user.

39. A host system for tracking documents stored on behalf of a plurality of organizations, the system comprising:
a database system having
a processor system,
volatile memory, and
non-volatile memory;
the non-volatile memory including at least one machine readable medium carrying one or more sequences of instructions which when implemented causes the processor system to implement a method comprising:
receiving at the host system, an original document to store on behalf of a first organization;
storing a copy of the original document to a document management storage in a storage accessible to the host system; and
tracking at the host system, the original document and the copy of the original document in the document management storage by a unique identifier assigned to the original document and a corresponding unique identifier assigned to the copy of the original document stored in the document management storage;
wherein the unique identifier assigned to the copy of the original document stored in the document management storage is tracked using a portion of a database resident at the host system limited to information of the first organization;
the method further comprising:
applying a hash function to the original document, therein generating a hash value, which is a checksum of the document;
assigning a version number to the original document,
storing the original document in document management storage;
including the hash value and version number within the unique identifier in association with the storing of the original document;
embedding the unique identifier within the original document;
revising the original document;
repeating the applying of the hash function, therein computing a new hash value, and repeating the assigning of the version number;
revising the unique identifier by at least replacing the hash value within the unique identifier with the new hash value;
repeating the embedding;
sending a message to a user inviting the user to join a group of users that have authorization to access the document management storage, the message including at least instructions for installing an application on a user system for checking whether documents on the user system are current;
receiving a message from the user system including at least the unique identifier;
in response, checking whether a document stored at the user system is current, based on the unique identifier sent and a unique identifier stored with the original document, the document stored on the user system being a copy of the original document; and
if it is determined that the document stored at the user system is not current and if the user requests to update the document stored in the user system, sending the original document to the user.

40. A host system for tracking documents stored on behalf of a plurality of organizations, the system comprising:
a database system having
a processor system,
volatile memory, and
non-volatile memory;
the non-volatile memory including at least one machine readable medium carrying one or more sequences of instructions which when implemented causes the processor system to implement a method comprising:
receiving at the host system, an original document to store on behalf of a first organization;
storing a copy of the original document to a document management storage in a storage accessible to the host system; and
tracking at the host system, the original document and the copy of the original document in the document management storage by a unique identifier assigned to the original document and a corresponding unique identifier assigned to the copy of the original document stored in the document management storage;
wherein the unique identifier assigned to the copy of the original document stored in the document management storage is tracked using a portion of a database resident at the host system limited to information of the first organization, where the host system is a database system.

* * * * *

UNITED STATES PATENT AND TRADEMARK OFFICE
CERTIFICATE OF CORRECTION

| | | |
|---|---|---|
| PATENT NO. | : 7,818,298 B2 | Page 1 of 1 |
| APPLICATION NO. | : 11/879535 | |
| DATED | : October 19, 2010 | |
| INVENTOR(S) | : Timothy J. Barker et al. | |

It is certified that error appears in the above-identified patent and that said Letters Patent is hereby corrected as shown below:

In column 2, line 46, replace "whether a shared documents has changed." with "whether a shared document has changed."

Signed and Sealed this

Twenty-first Day of December, 2010

David J. Kappos
*Director of the United States Patent and Trademark Office*